(12) United States Patent
Wang et al.

(10) Patent No.: US 11,009,654 B2
(45) Date of Patent: May 18, 2021

(54) ANTI-RESONANT HOLLOW CORE OPTICAL FIBER HAVING MULTIPLE RESONANT LAYERS

(71) Applicant: BEIJING UNIVERSITY OF TECHNOLOGY, Beijing (CN)

(72) Inventors: Pu Wang, Beijing (CN); Shoufei Gao, Beijing (CN); Yingying Wang, Beijing (CN)

(73) Assignee: BEIJING UNIVERSITY OF TECHNOLOGY

( * ) Notice: Subject to any disclaimer, the term of this patent is extended or adjusted under 35 U.S.C. 154(b) by 0 days.

(21) Appl. No.: 16/754,350

(22) PCT Filed: Mar. 27, 2018

(86) PCT No.: PCT/CN2018/080599
§ 371 (c)(1),
(2) Date: Apr. 7, 2020

(87) PCT Pub. No.: WO2019/071921
PCT Pub. Date: Apr. 18, 2019

(65) Prior Publication Data
US 2020/0241200 A1    Jul. 30, 2020

(30) Foreign Application Priority Data

Oct. 13, 2017   (CN) .......................... 201710954172.6

(51) Int. Cl.
*G02B 6/02*        (2006.01)
*G02B 6/036*       (2006.01)

(52) U.S. Cl.
CPC ..... *G02B 6/02328* (2013.01); *G02B 6/03605* (2013.01)

(58) Field of Classification Search
None
See application file for complete search history.

(56) References Cited

U.S. PATENT DOCUMENTS

2010/0328658 A1   12/2010   Benabid et al.
2017/0160467 A1    6/2017   Poletti et al.

FOREIGN PATENT DOCUMENTS

CN    105807363 A    7/2016
CN    106814421 A    6/2017
(Continued)

OTHER PUBLICATIONS

English translation of international search report of PCT/CN2018/080599.

*Primary Examiner* — Jerry Rahll
(74) *Attorney, Agent, or Firm* — Schlee IP International, PC; Alexander R. Schlee

(57) ABSTRACT

An anti-resonant hollow core optical fiber having multiple resonant layers. The optical fiber comprises a low-refractive index core region (1) and a high-refractive index cladding region. The high-refractive index cladding region comprises an inner cladding region (4) and an outer cladding region (5). The outer cladding region (5) clads the inner cladding region (4) and the core region (1). The inner cladding region (4) comprises a first anti-resonant layer (2) and a second anti-resonant layer (3), and the first anti-resonant layer (2) and the second anti-resonant layer (3) surround the core region (1); and the first anti-resonant layer (2) comprises several layers of microcapillary tubes, and the second anti-resonant layer (3) supports the first anti-resonant layer (2). The optical fiber adopts a double-cladding structure and uses two or more anti-resonant layers such that theoretically simulated loss is reduced to 0.1 dB/km, and has the features of ultralow transmission loss, wide spectral bandwidth, low bending loss, low transmission loss, high damage threshold and single-mode transmission.

9 Claims, 4 Drawing Sheets

(56) References Cited

FOREIGN PATENT DOCUMENTS

| | | |
|---|---|---|
| CN | 107797175 A | 3/2018 |
| EP | 3199991 A | 1/2016 |
| WO | 2017032454 A1 | 3/2017 |
| WO | 2017072750 A | 5/2017 |

ANTI-RESONANT HOLLOW CORE OPTICAL FIBER HAVING MULTIPLE RESONANT LAYERS

CROSS-REFERENCE TO RELATED APPLICATION

This application claims the benefit of CN Application No. 2017109541726 filed on Oct. 13, 2017, titled "ANTI-RESONANT HOLLOW CORE OPTICAL FIBER HAVING MULTIPLE RESONANT LAYERS", which is incorporated herein by reference in its entirety.

FIELD OF THE INVENTION

The present invention relates to the field of fiber communication technology, and in particular, to an anti-resonant hollow core optical fiber having multiple resonant layers.

BACKGROUND OF THE INVENTION

As a mainstream broadband access mode, optical fiber has the advantages of large communication capacity, long relay distance, good confidentiality, strong adaptability, small volume and light weight, wide raw material source and low price, etc., thus it will be widely applied in broadband Internet access in the future.

As a main research direction of optical fiber optics, hollow core optical fiber has significant advantages because the light is guided therein by means of the air in the fiber core. In comparison with the solid core optical fiber, the hollow core optical fiber uses the ultralow Rayleigh scattering and nonlinear coefficient of the air (several order of magnitudes lower than all glass materials), thus optical transmission of ultralow loss and low nonlinearity can be realized in principle. Additionally, a higher propagation velocity (i.e., smaller delay) and laser induced damage threshold may also be provided.

Under the inspiration of the concept of "photonic bandgap", photonic bandgap-type hollow core fiber introduces into the cladding an air pore structure periodically arranged to form the photonic bandgap. When the structure center has a defect of air pore, the light, whose wavelength is within the bandgap, may be totally restricted within the air core. In fact, as affected by the roughness at the interface between quartz and air, strong coupling occurs between the fundamental mode in the core and the surface mode in the cladding, and as a result, an experimental lowest loss is only 1.2 dB/km for such optical fiber at present, and the transmission performance of the optical fiber is also affected, especially the transmission of high-power laser is limited. On the other hand, the bandgap formation principle of the photonic bandgap hollow core fiber determines an intrinsic defect: the transmission bandwidth is narrow (hard to exceed 70 THz). This means that the application of photonic bandgap hollow core fiber limited to a very narrow range of spectral bandwidth, so that some application requiring wide spectral bandwidth transmission is excluded.

SUMMARY OF THE INVENTION

Therefore, it is an object of the present invention to provide an anti-resonant hollow core optical fiber with multiple resonant layers that can overcome or at least partially overcome the above defects, thereby solving the problem of low transmission efficiency, narrow transmission bandwidth, large bending loss, high transmission loss and low laser induced damage threshold of the prior-art optical fiber.

In one aspect of the invention, there provides an anti-resonant hollow core optical fiber, which comprises a low-refractive index core region and a high-refractive index cladding region, wherein the high-refractive index cladding region comprises an inner cladding region and an outer cladding region, the outer cladding region dads the inner cladding region and the fiber core region, the inner cladding region comprises a first anti-resonant layer and a second anti-resonant layer, and the first anti-resonant layer and the second anti-resonant layer surround the fiber core region; the first anti-resonant layer comprises several layers of microcapillary tubes, and the second anti-resonant layer supports the first anti-resonant layer.

Preferably, the high-refractive index cladding region comprises silicon dioxide, soft glass or plastic.

Preferably, the microcapillary tubes in each layer of microcapillary tubes form a ring-distributed structure, and each microcapillary tube in the innermost ring of microcapillary tubes does not contact each other.

Preferably, the second anti-resonant layer is an annular capillary tube or a rectangular tube, and the second anti-resonant layer is provided between adjacent two layers of the first anti-resonant layers and is tangent to each microcapillary tube in the two layers of the first anti-resonant layers.

Preferably, the second anti-resonant layer is further provided with a supporting component for supporting the adjacent two layers of the first anti-resonant layers, the supporting component is provided at a position other than the tangent point between the second anti-resonant layer and the microcapillary tube, and several microcapillary tubes having a support function are provided between the outermost second anti-resonant layer and the outer cladding region.

Preferably, the first anti-resonant layer comprises one layer or two layers, and the microcapillary tube is further provided with several layers of straight-line-type thin walls, wherein the several layers of straight-line-type thin walls are provided in parallel inside the microcapillary tube.

Preferably, the cross-section of the innermost microcapillary tube is a circle or an ellipse.

Preferably, the straight-line-type thin wall is a linear-structured quartz wall with a thickness of about 100 nm to 5000 nm, and the quartz wall is embedded in the innermost capillary tube.

Preferably, the innermost microcapillary tube in the first anti-resonant layer has a negative curvature shape.

Preferably, the distance between the circle centers of adjacent two microcapillary tubes in the first anti-resonant layer is no less than 10 μm.

The invention proposes an anti-resonant hollow core optical fiber having multiple resonant layers. By providing a first anti-resonant layer and a second anti-resonant layer in the inner cladding region of the optical fiber, employing a double-cladding structure and using two or more anti-resonant layers, theoretically-simulated loss can be lowered to 0.1 dB/km, thereby achieving the features of ultralow transmission loss, wide spectral bandwidth, low bending loss, low transmission loss, high laser induced damage threshold and single-mode transmission. At the same time, a high-efficiency and high-sensitivity ideal platform may be created for leading-edge applications such as nonlinear frequency conversion, gas/liquid trace detection and high-power pulse compression, etc.

DETAILED DESCRIPTION OF THE EMBODIMENTS

The specific implementation modes of the invention will be further described in detail below in conjunction with the drawings and embodiments. The embodiments below are provided for illustrating the invention, rather than limiting the scope of the invention.

An anti-resonant hollow core optical fiber includes a low-refractive index core region and a high-refractive index cladding region, wherein the high-refractive index cladding region includes an inner cladding region and an outer cladding region, the outer cladding region dads the inner cladding region and the fiber core region, the inner cladding region includes a first anti-resonant layer and a second anti-resonant layer, and the first anti-resonant layer and the second anti-resonant layer surround the fiber core region; the first anti-resonant layer includes several layers of microcapillary tubes, and the second anti-resonant layer supports the first anti-resonant layer.

The high-refractive index cladding region comprises silicon dioxide, soft glass or plastic.

The microcapillary, tubes in each layer of microcapillary tubes form a ring-distributed structure, and each microcapillary tube in the innermost ring of microcapillary tubes does not contact each other.

Embodiment 1

Figure 1:
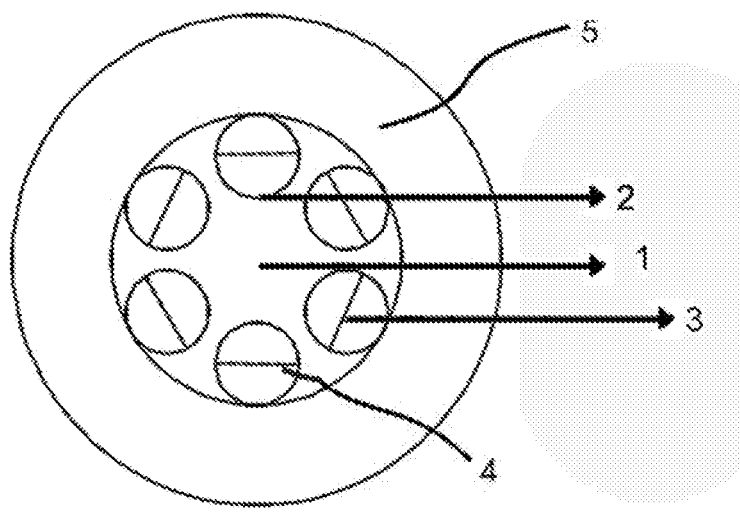
FIG. 1 is a schematic sectional view of an anti-resonant hollow core optical fiber according to Embodiment 1 of the invention.

As shown in FIG. 1, an anti-resonant hollow core optical fiber with multiple anti-resonant layers includes a low-refractive index core region and a high-refractive index cladding region, wherein the high-refractive index cladding region includes an inner cladding region 4 and an outer cladding region 5, and the outer cladding region 5 clads the inner cladding region 4 and the fiber core region 1. The outer cladding region 5 is the outer sleeve of the optical fiber. In this embodiment, the inner cladding region 4 includes a first anti-resonant layer 2, and the first anti-resonant layer 2 includes several) microcapillary tubes. The microcapillary tubes are annularly distributed around the fiber core region 1 at equal intervals, and the microcapillary tubes do not contact each other and form an annular structure without nodes or contacts.

In this embodiment, the low-refractive index fiber care region is filled with one or more gases, or is vacuum.

In this embodiment, the high-refractive index cladding region comprises silicon dioxide, soft glass or plastic. The microcapillary tube has a negative curvature shape, and the thickness thereof is in the same order of magnitude as the operating wavelength of the laser to be transmitted.

In this embodiment, the distance between the circle center of a microcapillary tube and the circle center of an adjacent microcapillary tube is at least 10 μm.

In this embodiment, in the first anti-resonant layer 2, each microcapillary tube is further provided with one straight-line-type thin wall 3, the straight-line-type thin wall 3 is distributed in parallel inside the microcapillary tube, and the connecting line of the center point of the cross-section of the straight-line-type thin wall 3 and the circle center of the outer cladding region 5 passes through the circle center or center of the microcapillary tube.

In this embodiment, the straight-line-type thin walls 3 are, several linear-structured quartz walls with a thickness of 100 nm to 5000 nm, and the quartz walls are embedded inside the microcapillary tube.

Embodiment 2

Figure 2:
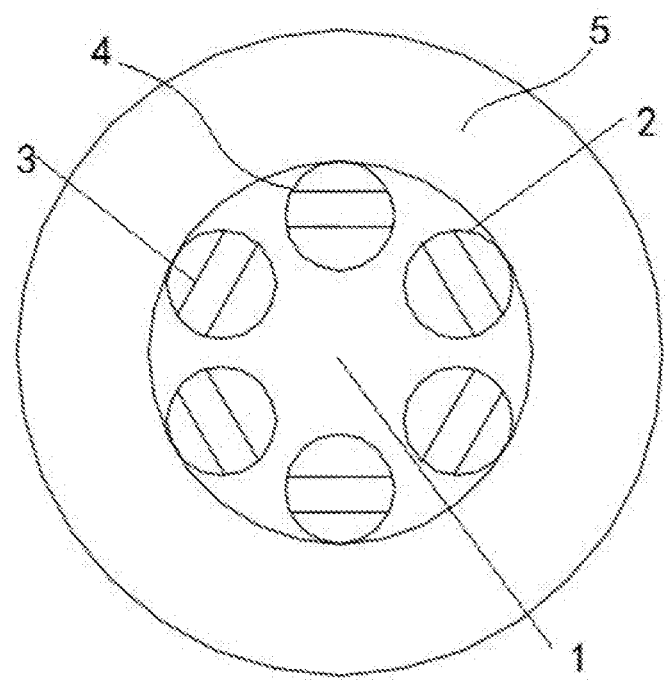
FIG. 2 is a schematic sectional view of an anti-resonant hollow core optical fiber according to Embodiment 2 of the invention.

As shown in FIG. 2, an anti-resonant hollow core optical fiber with multiple anti-resonant layers includes a low-refractive index core region 1 and a high-refractive index cladding region, wherein the high-refractive index cladding region includes an inner cladding region 4 and an outer cladding region 4, and the outer cladding region 5 clads the inner cladding region 4 and the fiber core region 1. The outer cladding region 5 is the outer sleeve of the optical fiber. In this embodiment, the inner cladding region 4 includes a first anti-resonant layer 2, and the first anti-resonant layer 2 includes several microcapillary tubes. The microcapillary tubes are annularly distributed around the fiber core region 1 at equal intervals, and the microcapillary tubes, do not contact each other and form an annular structure without nodes or contacts.

In this embodiment, the low-refractive index fiber core region is filled, with one or more gases, or is vacuum.

In this embodiment the high-refractive index cladding region comprises silicon dioxide, soft glass or plastic. The microcapillary tube has a negative curvature shape, and the thickness thereof is in the same order of magnitude as the operating wavelength of the laser to be transmitted.

In this embodiment, the distance between the circle center of a microcapillary tube and the circle center of an adjacent microcapillary tube is at least 10 μm.

In this embodiment, in the first anti-resonant layer 2, each microcapillary tube is further provided with two straight-line-type thin walls 3, and except that there are two straight-line-type thin walls 3, the other structure is the same as Embodiment 1. The two straight-line-type thin walls 3 are distributed in parallel inside the microcapillary tube, and the connecting line of the center point of the cross-section of the straight-line-type thin wall 3 and the circle center of the outer cladding passes through the circle center or center of the microcapillary tube.

In this embodiment, the straight-line-type thin walls 3 are several linear-structured quartz walls with a thickness of 100 nm to 5000 nm, and the quartz walls are embedded inside the microcapillary tube.

Embodiment 3

In this embodiment, except that there are several straight-line-type thin walls distributed inside the microcapillary tube, the other characteristics are the same as Embodiment 1 and Embodiment 2, and no repeated description will be given here.

Embodiment 4

Figure 3:
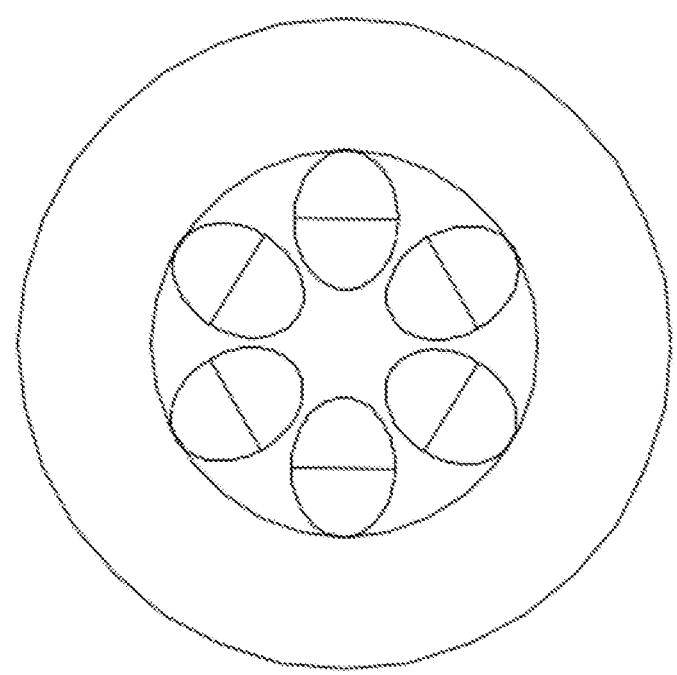
FIG. 3 is a schematic sectional view an anti-resonant hollow core optical fiber according to Embodiment 4 of the invention.

As shown in FIG. 3, in this embodiment, except that the microcapillary tube has a shape of ellipse, the other characteristics are the same as Embodiments 1 to 3, and no repeated description will be given here.

Embodiment 5

Figure 4:
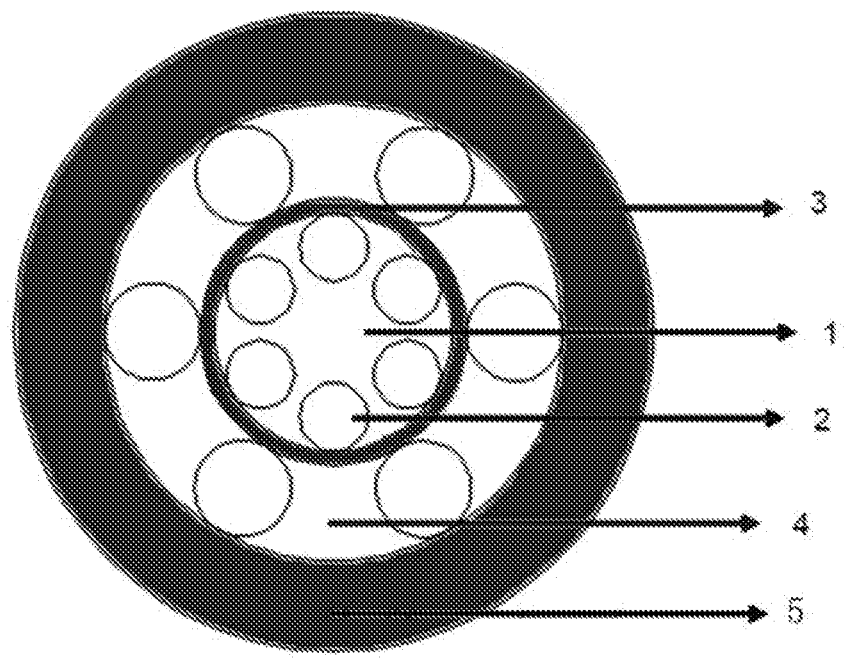
FIG. 4 is a schematic sectional view an anti-resonant hollow core optical fiber according to Embodiment 5 of the invention.

As shown in FIG. 4, a anti-resonant hollow core optical fiber with multiple anti-resonant layers includes a low-refractive index core region 1 and a high-refractive index cladding region, wherein the high-refractive index cladding region includes an inner cladding region 4 and an outer cladding region 5, and the outer cladding region 5 clads the inner cladding region 4 and the fiber core region 1. The outer cladding region 5 is the outer sleeve of the optical fiber. In this embodiment, the inner cladding region 4 includes a first anti-resonant layer 2, and the first anti-resonant layer 2 includes several microcapillary tubes. The microcapillary tubes are annularly distributed around the fiber core region at equal intervals, and the microcapillary tubes do not contact each other and form an annular structure without nodes or contacts.

In this embodiment, the low-refractive index core region is filled with one or more gases, or is vacuum.

In this embodiment, the microcapillary tubes do not contact each other and form an annular structure without nodes or contacts, and the microcapillary tubes have a negative curvature shape, and the thickness of the microcapillary tubes is in the same order of magnitude as the laser to be transmitted.

In this embodiment, the distance between the circle center of a microcapillary tube and the circle center of an adjacent microcapillary tube is at least 10 μm.

In this embodiment, there further includes a second anti-resonant layer 3. The second anti-resonant layer 3 is an annular capillary tube. As shown in FIG. 4, the inside of the second anti-resonant layer 3 is tangent to each microcapillary tube in the first anti-resonant layer 2, and several microcapillary tubes with a support function are provided between the outside of the second anti-resonant layer 3 and the outer cladding region 5.

In this embodiment, the second anti-resonant layer 3 is further provided with a supporting component for supporting the adjacent two layers of the first anti-resonant layers 2, and the supporting component is provided at a position other than the tangent point between the second anti-resonant layer 2 and the microcapillary tube.

In this embodiment, the cross-section of the microcapillary tube is a circle.

In this embodiment, the innermost microcapillary tube in the first anti-resonant layer 2 has a negative curvature shape.

In this embodiment the distance between the circle centers of adjacent two microcapillary tubes in the first anti-resonant layer 2 is no less than 10 μm, the second anti-resonant layer 2 is an annular structure with a thickness similar to that of the microcapillary tube and a material the same as that of the microcapillary tube. The thickness is about 200 nm to 5000 nm.

Embodiment 6

Figure 5:
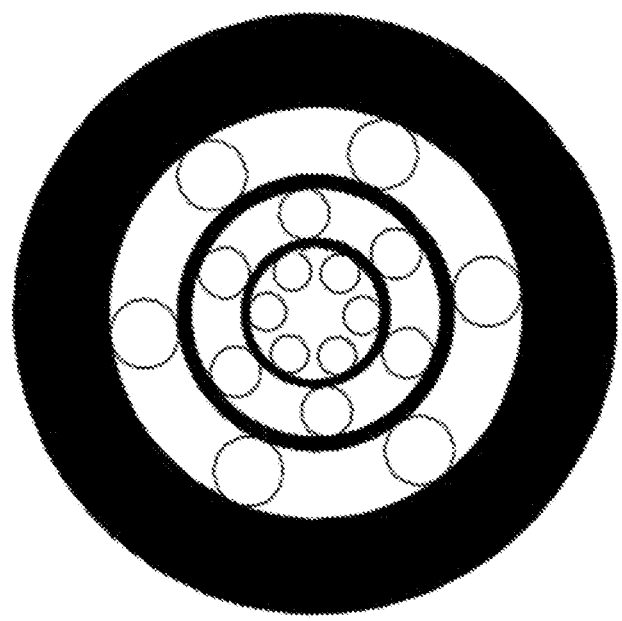
FIG. 5 is a schematic sectional view an anti-resonant hollow core optical fiber according to Embodiment 6 of the invention.

As shown in FIG. 5, an anti-resonant hollow core optical fiber with multiple anti-resonant layers includes a low-refractive index core region 1 and a high-refractive index cladding region, wherein the high-refractive index cladding region includes an inner cladding region 4 and an outer cladding region 5, and the outer cladding region 5 clads the inner cladding region 4 and the fiber core region 1. The outer cladding region 5 is the outer sleeve of the optical fiber. In this embodiment, the inner cladding region includes two layers of first anti-resonant layers 2, and the first anti-resonant, layer 2 includes several microcapillary tubes. The microcapillary tubes are annularly distributed around the fiber core region at equal intervals, and the microcapillary tubes do not contact each other and form an annular structure without nodes or contacts.

In this embodiment, the low-refractive index core region is filled with one or more gases, or is vacuum.

In this embodiment, the microcapillary tubes do not contact each other and form an annular structure without nodes or contacts, and the microcapillary tubes have a negative curvature shape, and the thickness of the microcapillary tubes is on the same order of magnitude as the laser to be transmitted.

In this embodiment. the distance between the circle center of a microcapillary tube and the circle center of an adjacent microcapillary tube is at least 10 μm.

In this embodiment, there further includes a second anti-resonant layer. The second anti-resonant layer is an annular capillary tube. As shown in FIG. 5, there are two anti-resonant layers 3. The first one is provided between two layers of the first anti-resonant layers 2 and is tangent to the microcapillary tubes in each first anti-resonant layer 2. The inside of the other second anti-resonant layer 3 is tangent to each microcapillary tube in the outermost first anti-resonant layer 1, and several microcapillary tubes with a support function are provided between the outside of the other second anti-resonant layer 3 and the outer cladding region 5. The second anti-resonant layer 3 is an annular structure with a thickness similar to that of the microcapillary tube and a material the same as that of the microcapillary tube. The thickness is about 200 nm to 5000 nm.

In this embodiment, the second anti-resonant layer 3 is further provided with a supporting component for supporting the adjacent two first anti-resonant layers 2, and the supporting component is provided at a position other than the tangent point between the second anti-resonant layer 3 and the microcapillary tube.

In this embodiment, the cross-section of the microcapillary tube is a circle.

In this embodiment, the innermost microcapillary tube in the first anti-resonant layer 2 has a negative curvature shape.

In this embodiment, the distance between the circle centers of adjacent two microcapillary tubes in the first anti-resonant layer 2 is no less than 10 μm.

Embodiment 7

In this embodiment, an anti-resonant hollow core optical fiber includes a low-refractive index core region and a high-refractive index cladding region, wherein the high-refractive index cladding region includes an inner cladding region and an outer cladding region, and the outer cladding region clads the inner cladding region and the fiber core region. The inner cladding region includes a first anti-resonant layer and a second anti-resonant layer, and the first anti-resonant layer and the second anti-resonant layer surround the fiber core region. The first anti-resonant layer includes several layers of microcapillary tubes, and the second anti-resonant layer supports the first anti-resonant layer.

The second anti-resonant layer is an annular capillary tube or a rectangular tube, and the second anti-resonant layer is provided between adjacent two first anti-resonant layers and is tangent to each microcapillary tube in the two first anti-resonant layers.

In this embodiment, the second anti-resonant layer is further provided with a supporting component for supporting the adjacent two first anti-resonant layers. The supporting, component is provided at a position other than the tangent point between the second anti-resonant layer and the microcapillary tube, and several microcapillary tubes with a support function are provided between the outermost second anti-resonant layer and the outer cladding region, Embodiment 8

Figure 6:
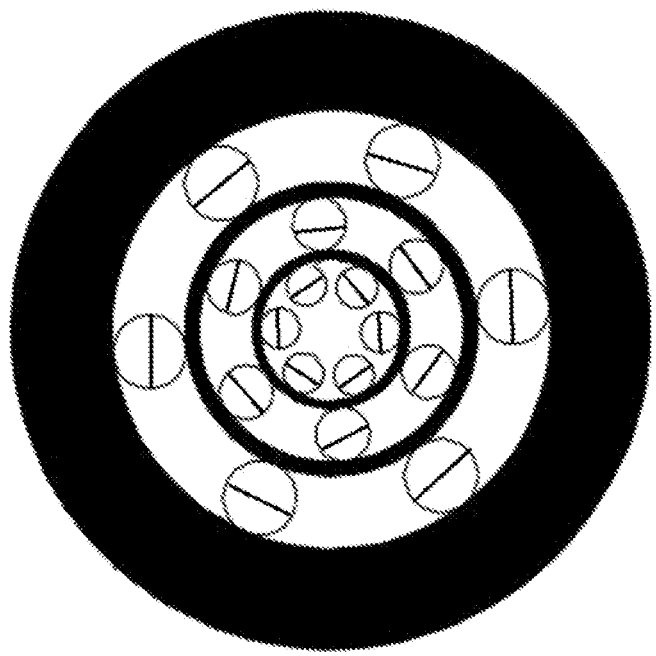
FIG. 6 is a schematic sectional view an anti-resonant hollow core optical fiber according to Embodiment 8 of the invention.

As shown in FIG. 6, in this embodiment, in conjunction with the characteristics of Embodiments 1-7, an optical fiber structure with three anti-resonant layers is provided. Based on Embodiment 6, a straight-line-type thin wall is added into each layer of the microcapillary tubes. Only one layer is shown in the drawings, but the invention is not limited thereto, and there may be multiple layers. In the drawings, there may also be one or more first anti-resonant layers and second anti-resonant layers. The other characteristics of this embodiment are the same as Embodiments 1-7, and no repeated description will be given here.

Embodiment 9

Figure 7:
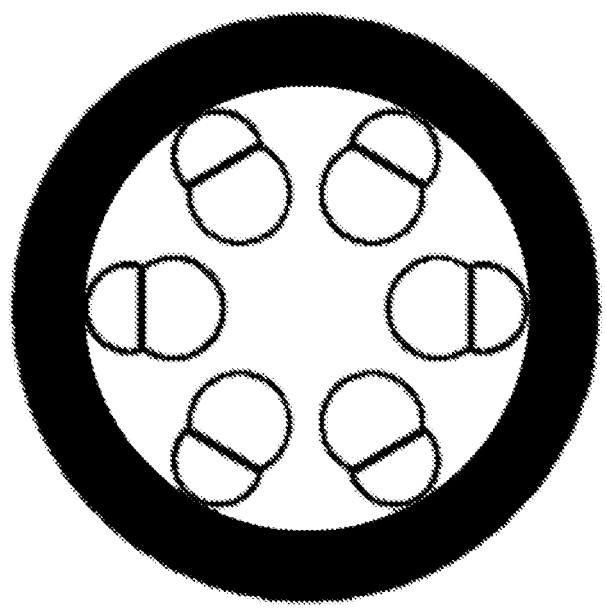
FIG. 7 is a schematic sectional view an anti-resonant hollow core optical fiber according to Embodiment 9 of the invention.

As shown in FIG. 7, based on any one of the above Embodiments 1 to 8, during the specific manufacturing process, the inner cladding region 4 may further deform as shown in FIG. 7 when being stretched, so that the inner cladding region is divided into two or more imperfect circular regions that are joined together.

In conclusion, the invention puts, forwards an anti-resonant hollow core optical fiber having multiple resonant layers, wherein a first anti-resonant layer and a second anti-resonant layer are provided in the inner cladding region of the optical fiber. By employing a double-cladding structure and using two or more anti-resonant layers, theoretically-simulated loss can be lowered to 0.1 dB/km, thereby achieving the features of ultralow transmission loss, wide spectral bandwidth, low bending loss, low transmission loss, high laser induced damage threshold and single-mode transmission. At the same time, a high-efficiency and high-sensitivity ideal platform may be created for leading-edge applications such as nonlinear frequency conversion, gas/liquid trace detection and high-power pulse compression, etc.

Finally, the method according to the invention merely shows a preferred implementation mode, rather than limiting the protection scope of the invention. Therefore, all modifications, equivalent substitutions and improvements made without departing from the spirit and principle of the invention should fall into the protection scope of the invention.

What is claimed is:

1. An anti-resonant hollow core optical fiber, comprising a low-refractive index core region and a high-refractive index cladding region, wherein the high-refractive index cladding region comprises an inner cladding region and an outer cladding region, the outer cladding region clads the inner cladding region and a fiber core region, the inner cladding region comprises a first anti-resonant layer and a second anti-resonant layer, and the first anti-resonant layer and the second anti-resonant layer surround the fiber core region; the first anti-resonant layer comprises several layers of microcapillary tubes, and the second anti-resonant layer supports the first anti-resonant layer, wherein the second anti-resonant layer is an annular capillary tube or a rectangular tube, and the second anti-resonant layer is provided between adjacent two layers of the first anti-resonant layers and is tangent to each microcapillary tube in the two layers of the first anti-resonant layers.

2. The anti-resonant hollow core optical fiber according to claim 1, wherein the high-refractive index cladding region comprises silicon dioxide, soft glass or plastic.

3. The anti-resonant hollow core optical fiber according to claim 1, wherein the microcapillary tubes in each layer of microcapillary tubes form a ring-distributed structure, and each microcapillary tube in the innermost ring of microcapillary tubes does not contact each other.

4. The anti-resonant hollow core optical fiber according to claim 1, wherein the second anti-resonant layer is further provided with a supporting component for supporting the adjacent two layers of the first anti-resonant layers, the supporting component is provided at a position other than the tangent point between the second anti-resonant layer and the microcapillary tube, and several microcapillary tubes having a support function are provided between the outermost second anti-resonant layer and the outer cladding region.

5. The anti-resonant hollow core optical fiber according to claim 1, wherein the first anti-resonant layer comprises two layers, and the microcapillary tube is further provided with several layers of straight-line-type thin walls, wherein the several layers of straight-line-type thin walls are provided in parallel inside the microcapillary tube.

6. The anti-resonant hollow core optical fiber according to claim 5, wherein a cross-section of the innermost microcapillary tube is a circle or an ellipse.

7. The anti-resonant hollow core optical fiber according to claim 5, wherein the straight-line-type thin wall is a linear-structured quartz wall with a thickness of about 100 nm to 5000 nm, and the quartz wall is embedded in the innermost capillary tube.

8. The anti-resonant hollow core optical fiber according to claim 1, wherein the innermost microcapillary tube in the first anti-resonant layer has a negative curvature shape.

9. The anti-resonant hollow core optical fiber according to claim 1, wherein a distance between the circle centers of adjacent two microcapillary tubes in the first anti-resonant layer is no less than 10 μm.

* * * * *